(No Model.) 2 Sheets—Sheet 1.
C. A. MAYNARD.
PNEUMATIC TIRE.
No. 604,541. Patented May 24, 1898.
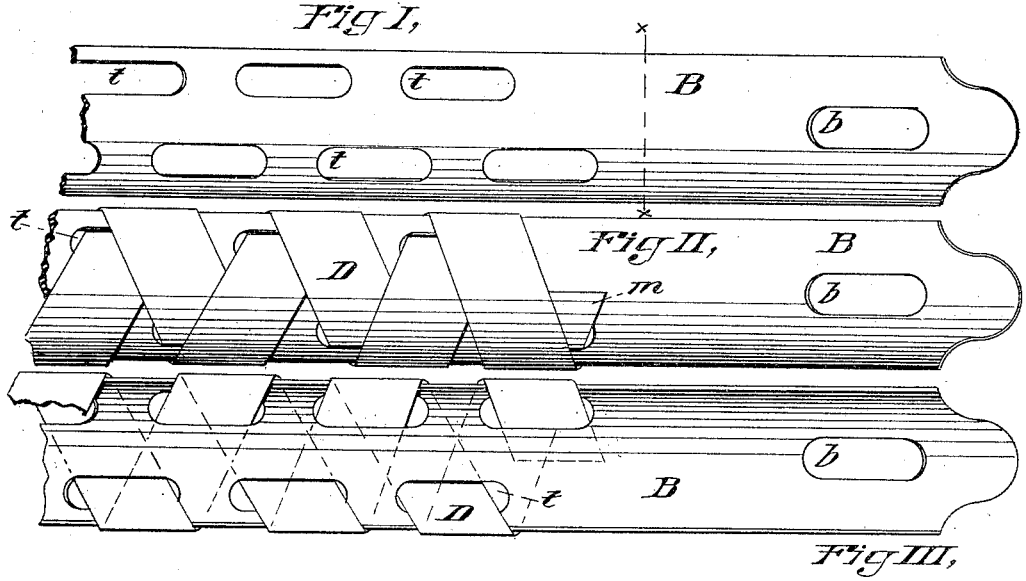
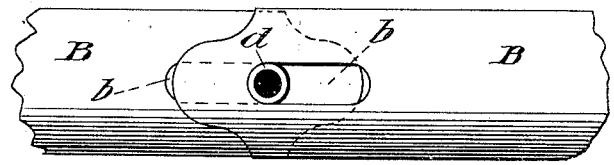
Witnesses,
Jason Perkins
Lyman H. Perkins
Inventor,
C. A. Maynard
by his attorney
R. F. Hyde (No Model.) 2 Sheets—Sheet 2.
C. A. MAYNARD.
PNEUMATIC TIRE.
No. 604,541. Patented May 24, 1898.
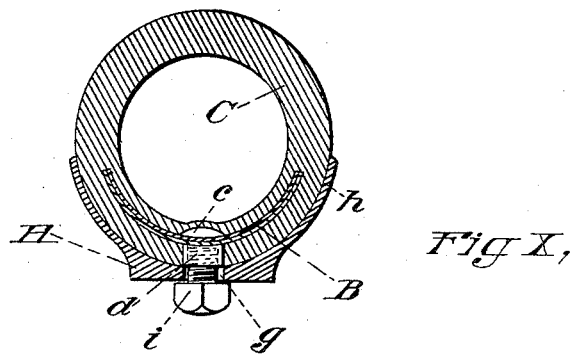
Fig X.
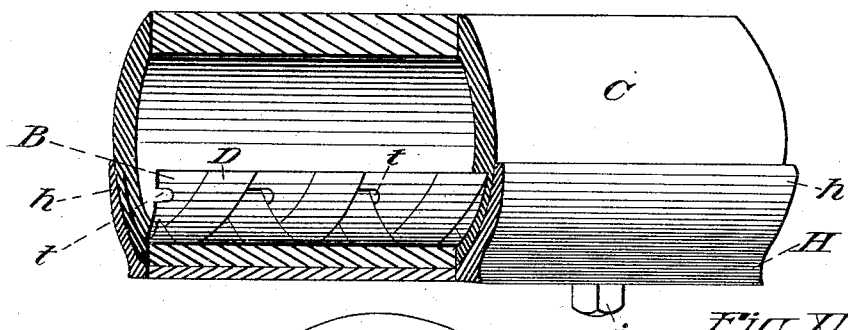
Fig XI.
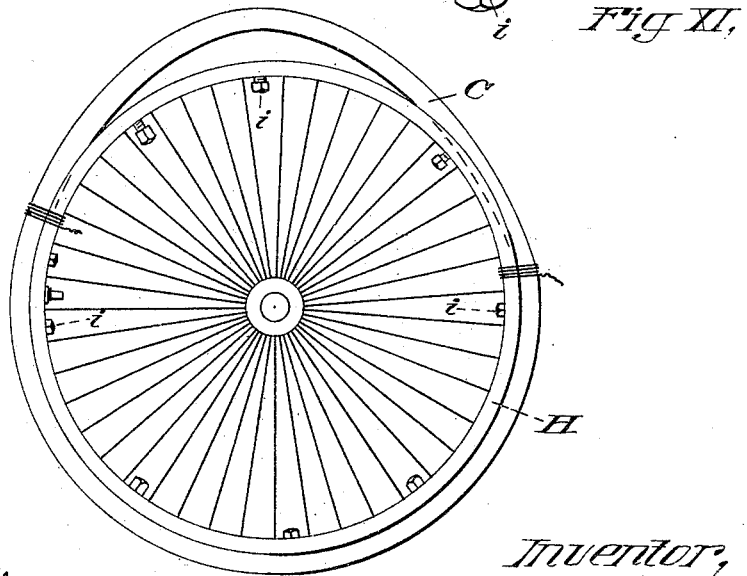
Fig XII.
Witnesses,
Jason Perkins
Lyman H. Perkins
Inventor,
C. A. Maynard
by his attorney
R. F. Hyde

UNITED STATES PATENT OFFICE.

CHARLES A. MAYNARD, OF SPRINGFIELD, MASSACHUSETTS.

PNEUMATIC TIRE.

SPECIFICATION forming part of Letters Patent No. 604,541, dated May 24, 1898.

Application filed January 28, 1898. Serial No. 668,232. (No model.)

*To all whom it may concern:*

Be it known that I, CHARLES A. MAYNARD, a citizen of the United States, residing at Springfield, in the county of Hampden and State of Massachusetts, have invented certain new and useful Improvements in Pneumatic Tires, of which the following is a specification, reference being had therein to the accompanying drawings.

My improvements relate more particularly to the combination, with a single-tube pneumatic tire, of a clamp-band adapted to bring the tire to its seat on the rim or felly by either compressing it to shorten its length or by expanding it to leave it in a state of tension, as in the common method, and to also provide for such a firm union of the tire and felly or rim that no movement of the tire can take place relative to its seat on rim or felly to displace the valve-stem or cause other injury.

My invention is fully illustrated in the accompanying drawings, in which—

Figure I is a plan view of a portion of my clamp-band near one end. Fig. II is the same combined with a lacing. Fig. III is a plan view in reverse of Fig. II. Fig. IV is a cross-section on the dotted line $x\ x$ of Fig. I. Fig. V is a side view of the part shown in Fig. II. Fig. VI is a side view of two joined ends of the band with a part broken away. Fig. VII is a plan view of the inner side of two joined ends of the band before the holes therein coincide. Fig. VIII is a bottom plan view of the clamp-nut. Fig. IX is an end elevation of the nut combined with a clamp-screw. Fig. X is a cross-section of a tire and felly having the clamp-band combined therewith and shown at the joint of the band. Fig. XI is a portion of a tire, felly, and clamp-band shown in partial longitudinal and transverse section and exhibiting a part of the clamp-band uncovered; and Fig. XII shows a tire inclosing a clamp-band in the act of being combined with the felly.

Heretofore it has been customary to combine pneumatic tires with the felly or its rim by stretching the tire over the rim to be seated within its flanges and to leave the tire in a state of more or less tension when upon the wheel; but I have found that by combining the tire with the felly so that it shall be in a compressed condition the life of the tire is much extended, offering more resistance to punctures or abrading wear than it would even if combined with the felly in its normal state of simply freedom from tension, to accomplish which compressing of the tire I combine with it a clamp-band constructed as follows:

B is a sheet-metal band, in cross-section a segment of a circle, having the radius of the tire C, in which it is embedded. In cross-section the band B is preferably less than a semicircle, so that when arranged in that wall of the tire coming against the felly the edges of the band will lie below the peripheries of the flanges $h$ of the felly H.

The band B is prolonged within the tire C entirely around it to have ends secured together, and thus constitute in longer as well as its shorter axis a light strong arch.

The band B is combined with the tire C by being embedded, as shown, within that wall of the tire which is seated in the felly H to have the center or crown of the band come opposite the center of the felly, and when the tire is seated on the felly bolts bearing the band, interposed layer of tire, and felly together form of them a structure in which there can be no relative movement of either of the three parts upon each other, thus obviating the creeping of the tire, which has heretofore been the source of so much trouble, and the band being a continuous hoop and intimately connected with the tire affords holding-surface for bolts from the felly to retain a compressed tire in place. The ends of the band are provided with elongated holes $b$, which permit a sliding of said ends upon each other around the stem of a clamp-nut, the head of which rests upon the band and is inclosed between it and a layer of the rubber of the tire inclosing the band.

The band B may be integral with only two of the holes $b$ in its corresponding ends, or may be composed of sections having the holes $b$ in all of the section ends.

In combining the band with the tire C it is preferably vulcanized to the tire over its entire surface except for a portion of its length on each side of a joint, which unattached rubber portion is compressible or expansive to permit the tire to be either compressed to the felly or stretched over it. Where several sections compose the band, the clamp-nuts and screws through the joints of said sections are ordinarily enough to bind the tire to the felly; but where only one joint is in the clamp-band ordinary clamp-bolts passing from the band to the felly may be employed in the required number. When the tire is compressed to be seated uniformly upon the felly, the free ends of the band sliding on each other are clamped to each other and to clamp the tire to the felly by bolts passing from the felly into the nut inclosed in the elongated holes forming the joint. When the tire is distended to stretch over the flanges $h$ of the felly, to be combined with the felly, the corresponding elongated holes $b$ become, with the nut and stem through them, an extension-joint, the contraction of the tire when finally seated bringing the holes into coincidence. From the position of the holes relative to the stem of the clamp-nut in Fig. VII, in the case of compression exerted upon the tire they would be changed to a locking position by compressive force applied to the tire, in the case of expanding the tire to seat it. The contraction of the tire itself when free to do so would restore the holes to a correspondence.

In Fig. XII the tire is shown in the act of being compressed upon the felly and fast to it where sufficiently compressed, with bolts in the felly ready to be run into the nuts in the tire as they are brought opposite them.

The mechanical device shown for securing tire to felly and forming a contraction or extension joint with the elongated holes $b$ in the band ends consists of a clamp-nut with an elongated head $c$ of greater length than the holes $b$, so as to present a shoulder always bearing upon the band outside of the holes, as the nut-stem $d$ extends through said holes, a stem $d$, passing through the holes from the head, and a threaded nut in the stem $d$ to receive the end of a screw-bolt $i$, passing through the felly with its head bearing against the inner surface of the felly. The head $c$ of the nut, as more particularly shown in Fig. X, is inclosed between the interior layer of rubber of the tire and the band ends, while the stem $d$ passes through the bands and the exterior layer of rubber inclosing them. The threaded stem, when the tire is seated on the felly, comes opposite the bolt-holes $g$ in the felly, so that bolt $i$ is operative to securely bind the tire to the felly. The clamp-pressure of the head upon one surface of the band would usually be sufficient to bind the tire securely to the felly; but in very heavy vehicles to guard against any possible slipping of the band ends at the joint I form within the head $c$ and joining it to the stem $d$ a shoulder $y$ of a depth or thickness equal to the combined thicknesses of the band ends overlapping and in contact and of a contour in plan just conforming to the elongated holes, so that when the holes coincide, as shown in Fig. VI, the shoulder is drawn into to fill them and so lock the ends together to render any sliding movement one on the other impossible. When the tire is to be compressed or elongated at a joint, the shoulder $y$ is pushed through and out of the holes to ride on the band outside of them and so permit the movement of the band ends upon each other to be drawn by a bolt $i$ into the holes when they coincide.

When a tire is combined with a felly by being stretched over it, the tension of the tire binds it to the felly, so that little more than a creeping of the tire upon the felly or a lateral displacement of a portion of it has to be guarded against; but when a tire is combined with the felly by being compressed thereon the tendency of all parts of the tire not under weight is to spring up from the felly; but by the clamp-band shown all parts of the tire may be made to closely hug the felly and in the most secure manner.

Although a metallic band of the configuration shown may be prepared by being coated with shellac or other material for being vulcanized to the walls of the tire over the desired surface, I find that an improved union between the metal and the rubber can be effected by providing the metal band with a surface of woven fabric, which fabric can be firmly secured to the metal by being laced to it through holes formed through the band in a manner not to be attained by wrapping the fabric merely upon the outside of the band or by cementing or otherwise pasting the fabric to the metal, as by lacing, as shown, through holes in the band there can be no movement of the fabric upon the band, and the curvature of the band is practically preserved upon both sides to thus present the largest vulcanizing-surface.

In the drawings a series of elongated holes $t$ is shown arranged in two parallel rows near the opposite edges of the band B, with their longer axes parallel with said edges. The lacing, formed, preferably, of woven fabric, such as cotton cloth and in tape form, so as to have a selvage on each edge, is laced tightly to the band by being drawn in and out through these holes, the otherwise free ends being tucked under one strand of the lacing to secure it, as shown at $m$, Fig. II. The holes $t$, having a length equal to the width of the lacing D, may be disposed opposite to each other on the two sides of the band B, or, as shown, to have the centers of one series come opposite the intervals between the holes of the other series and so break joints, with the advantage that the strength of the band is maintained uniform throughout its length, and so that the angle made by the lacing to the longer axis of the band is equal in both directions. The band is preferably coated with some adhesive quickly-drying preparation before the lacing is applied, such as shellac, and before this coating dries the lacing is combined with the band to adhere to it.

It will be seen that, as applied in the drawings, the lacing D passes over the edges of the band B and entirely over its convex side, while the chord of the arc upon the concave side is so short as to be in effect concentric thereto and is so brief in extent as to present a rigid surface for vulcanizing. The space between the holes $t$ on the concave side of the band B, uncovered by lacing, supplies space for the bolt-holes other than the ones for the joint or joints, which holes are ordinary round bolt-holes extending through the band and its conforming lacing upon the convex side. A band B so constructed can be vulcanized into the single wall of the tire to be practically integral therewith, and when a tire so constructed is bolted to a felly any independent movement of the parts is impossible.

Now, having described my invention, what I claim is—

1. A single-tube pneumatic tire, a retaining-band embedded in the wall thereof in contact with the felly, and comprising one or more metal sections, segments of a circle in cross-section joined with overlapping ends to form a complete hoop, and anchored on both sides to the tube between its free ends, corresponding elongated holes in the band ends, and bolts through said holes for binding the tube to the felly.

2. A single-tube pneumatic tire, a retaining-band comprising one or more metal sheets bent to form a segment of a circle in cross-section with ends joined to form a complete circle in the plane of the wheel and combined with the wall of the tube seated in the felly by being embedded therein and vulcanized or cemented fast to the tube between the free ends of the band, a felly seating said tube and band—and bolts bearing the band and tube to the felly.

3. A single-tube pneumatic rubber tire, a clamp-band comprising a metal sheet a segment of a circle in cross-section with ends joined to complete a hoop, embedded in the tire-wall and provided at intervals of its length with a covering of fabric united to it by being laced through holes therein, whereby a vulcanizing or cementing surface is formed for the union of the band and inclosing rubber—and a felly bolted to the tire through the band.

4. A single-tube pneumatic rubber tire, a clamp-band comprising a hoop of sheet metal a segment of a circle in cross-section, with ends provided with joints to permit a movement one upon the other, and embedded in the wall of the tire, a covering to the band of woven fabric in the form of a tape laced through perforations in the band, substantially as set forth, and forming a vulcanizing surface—and a felly bolted to the tire through the band.

CHARLES A. MAYNARD.

Witnesses:
R. F. HYDE,
JASON PERKINS.